United States Patent [19]
Fruzzetti

[11] Patent Number: 4,735,084
[45] Date of Patent: Apr. 5, 1988

[54] METHOD AND APPARATUS FOR GROSS LEAK DETECTION

[75] Inventor: Paul R. Fruzzetti, N. Easton, Mass.

[73] Assignee: Varian Associates, Inc., Palo Alto, Calif.

[21] Appl. No.: 782,649

[22] Filed: Oct. 1, 1985

[51] Int. Cl.$^4$ ............................................. G01M 3/20
[52] U.S. Cl. .................................................. 73/40.7
[58] Field of Search ........................................ 73/40.7

[56] References Cited

U.S. PATENT DOCUMENTS

| | | | |
|---|---|---|---|
| 2,721,270 | 10/1955 | Bennett | 73/40 |
| 3,520,176 | 7/1970 | Becker | 73/40.7 |
| 3,616,680 | 11/1971 | Schrader | 73/40.7 |
| 3,626,760 | 12/1971 | Briggs et al. | 73/40.7 |
| 3,690,151 | 9/1972 | Briggs | 73/40.7 |
| 4,204,815 | 5/1980 | Le Blanc | 418/13 |
| 4,294,106 | 10/1981 | Gevaud et al. | 73/40.7 |
| 4,472,962 | 9/1984 | Mennenga | 73/40.7 |
| 4,499,752 | 2/1985 | Fruzzetti et al. | 73/40.7 |

OTHER PUBLICATIONS

Worthington, "New Developments in Trapless Leak Detection," *Vacuum Technology Research/Development*, Nov. 1976.
*Introduction to Helium Mass Spectrometer Leak Detection*, Varian Associates, Inc., 1980, pp. 26–45.
"New Dimensions in Leak Detection," Varian Brochure, Dec. 1982.

*Primary Examiner*—Stuart J. Levy
*Assistant Examiner*—Hezron E. Williams
*Attorney, Agent, or Firm*—Stanley Z. Cole; John C. Yakes; William R. McClellan

[57] ABSTRACT

A helium mass spectrometer leak detector includes a spectrometer tube connected to the inlet of a high vacuum pump. Helium tracer gas passes in reverse direction through the high vacuum pump from the foreline to the spectrometer tube. Relatively high pressure gross leak tests are performed, while maintaining the foreline of the high vacuum pump at the required operating pressure of about 100 millitorr, by passing the tracer gas in reverse direction through one or two stages of a mechanical vacuum pump. Test port pressures up to about atmosphere can be accommodated, with only a single mechanical vacuum pump required. According to another feature, high test port pressures are accommodated using a variable flow restrictor and reverse-connected mechanical vacuum pump in combination.

21 Claims, 2 Drawing Sheets

METHOD AND APPARATUS FOR GROSS LEAK DETECTION

BACKGROUND OF THE INVENTION

This invention relates to detection of leaks in sealed articles and, more particularly, to methods and apparatus for leak detection at relatively high test port pressures which occur at high leak rates.

Helium mass spectrometer leak detection is a well-known leak detection technique. Helium is used as a tracer gas which passes through the smallest of leaks in a sealed test piece. The helium is then drawn into a leak detection instrument and measured. The quantity of helium corresponds to the leak rate. The most important component of the instrument is a mass spectrometer tube which detects and measures the helium. The input gas is ionized and mass analyzed by the spectrometer tube in order to separate the helium component, which is then measured. In one approach, a test piece is pressurized with helium. A sniffer probe connected to the test port of a leak detector is moved around the exterior of the test piece. In the vicinity of a leak, helium is drawn into the probe and is measured by the leak detector. In an alternative approach, the interior of a test piece is coupled to the test port of the leak detector. Helium is sprayed onto the exterior of the test piece, is drawn inside through a leak and is measured by the leak detector. Helium mass spectrometer leak detection provides good sensitivity, a wide dynamic range, and is fast and convenient to use.

One or the requirements of the spectrometer tube is that the inlet through which the helium and other gases are received be maintained at a relatively low pressure, typically below $2 \times 10^{-4}$ torr. In a so-called conventional leak detector, a roughing pump, a diffusion pump and associated forepump, and a cold trap are utilized in a conventional vacuum pumping arrangement to maintain the input of the spectrometer tube at the required pressure. However, since the test port must be maintained at a relatively low pressure during a leak test, the rough pumping cycle is relatively long. Furthermore, in the testing of leaky or large volume parts, which results in a high test port pressure, it may be difficult or impossible to achieve the required pressure level. If the required pressure level can be achieved at all, the pumping cycle is lengthy.

Many of these problems were eliminated in the counterflow leak detector disclosed by Briggs in U.S. Pat. No. 3,690,151. In this leak detector, the mass spectrometer tube is connected to the inlet of a diffusion pump and the helium tracer gas is introduced through the foreline, or normal output port, of the diffusion pump. The diffusion pump exhibits a high pressure ratio for heavier gases, but a low pressure ratio for lighter gases such as helium. Therefore, helium diffuses at an acceptable rate in a reverse direction through the diffusion pump to the spectrometer tube and is measured. Heavier gases in the sample are, to a large degree, blocked by the diffusion pump and prevented from reaching the spectrometer tube. Due to the method of reverse flow in the diffusion pump, the leak detector test port can be operated at the pressure required at the diffusion pump foreline. This pressure, typically 100 millitorr, is several orders of magnitude higher than the required operating pressure of the spectrometer tube and is relatively easy to attain.

A test port pressure of 100 millitorr is satisfactory for many leak test applications. Nonetheless, it is desirable in some applications to perform leak tests on very large or leaky parts where this test port pressure level cannot be attained. Heretofore, it has been possible to perform helium mass spectrometer leak tests with test port pressures above 100 millitorr, but only with the use of two mechanical vacuum pumps and an intermediate flow restrictor to maintain the foreline pressure at or below 100 millitorr.

It is a general object of the present invention to provide novel methods and apparatus for mass spectrometer leak detection.

It is another object of the present invention to provide methods and apparatus for performing mass spectrometer leak tests at test port pressures substantially above 100 millitorr utilizing only one mechanical pump.

It is still another object of the present invention to provide methods and apparatus for leak detection wherein the helium tracer gas passes in reverse direction through at least one stage of a mechanical vacuum pump, so as to permit testing at high test port pressures.

SUMMARY OF THE INVENTION

According to the present invention, these and other objects and advantages are achieved in apparatus for leak detection at relatively high test port pressure. The apparatus comprises a test port adapted for receiving a test sample containing a trace gas; a leak detection instrument requiring a relatively low pressure for proper operation; a mechanical vacuum pump having an inlet and an interstage connection point between first and second stages, and interconnection means for making fluid connection between the test port and the interstage connection point, and for making fluid connection between the inlet of the vacuum pump and the leak detection instrument during a gross leak test cycle. The trace gas passes, at least in part, in reverse direction through the mechanical vacuum pump to the leak detection instrument.

Typically, the leak detection instrument comprises a gas analysis instrument such as a mass spectrometer tuned to detect the trace gas and having an inlet for receiving the trace gas, and further comprises high vacuum pumping means characterized by a relatively high reverse diffusion rate for light gases and a relatively low reverse diffusion rate for heavy gases. The high vacuum pumping means has a pump inlet coupled to the inlet of the gas analysis instrument and a foreline which is the inlet of the leak detection instrument.

According to another aspect of the invention, the interconnection means further includes means for making fluid connection between the test port and a gas ballast port on the output side of the second stage of the mechanical vacuum pump, and for making fluid connection between the inlet of the mechanical pump and the leak detection instrument during a high pressure gross leak test cycle. The trace gas passes, at least in part, in reverse direction through both stages of the mechanical vacuum pump to the leak detection instrument.

According to yet another aspect of the present invention, the above-described leak detection apparatus further includes means for sensing the pressure level at the test port and providing a test port pressure signal, and restriction means disposed in the fluid connection between the test port and the interstage connection point for restricting the flow of gas in response to the test port pressure signal, in accordance with a predetermined relationship between the test port pressure and flow rate. The restriction means can comprise a modulator valve.

According to still another aspect of the present invention, there is provided a method for leak detection at relatively high test port pressure with a leak detection instrument requiring a relatively low pressure for proper operation. The method comprises the steps of initially evacuating the test port by connecting the inlet of a mechanical pump thereto while isolating the leak detection instrument from the test port, and subsequently connecting the test port to an outlet of a stage of the mechanical pump and connecting the inlet of the mechanical vacuum pump to the inlet of the leak detection instrument, such that the inlet of the leak detection instrument is maintained at low pressure and the trace gas received at the test port passes, at least in part, in reverse direction through the mechanical vacuum pump to the leak detection instrument.

BRIEF DESCRIPTION OF THE DRAWINGS

For a better understanding of the present invention, together with other and further objects, advantages and capabilities thereof, reference may be had to the accompanying drawings which are incorporated herein by reference and in which.

DETAILED DESCRIPTION OF THE INVENTION

Figure 1:
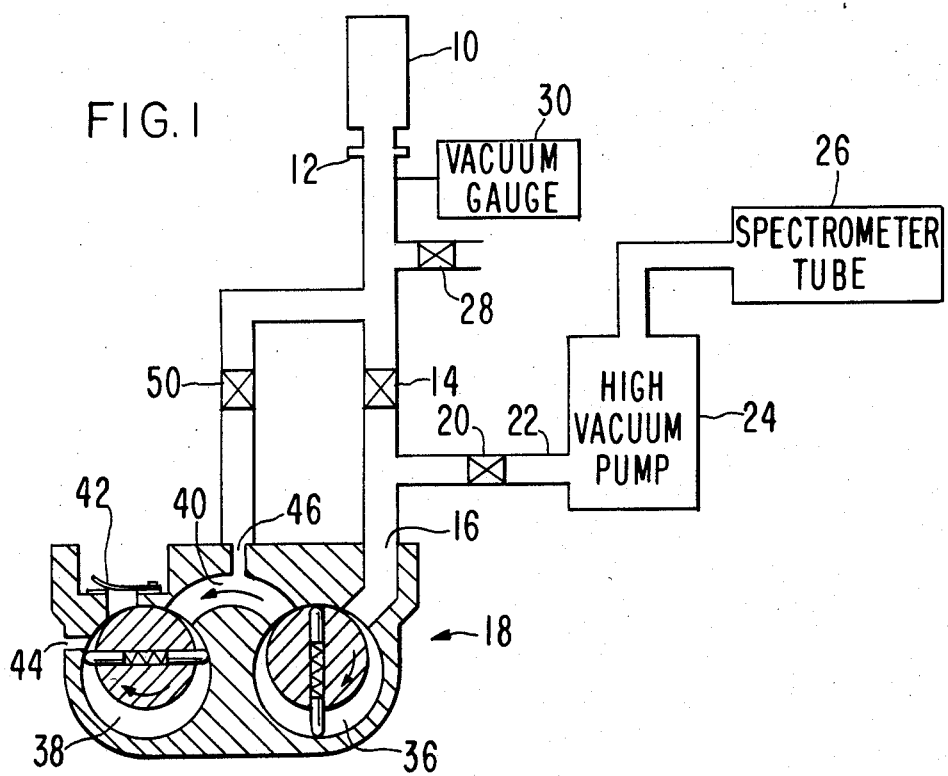
FIG. 1 is a schematic diagram of a leak detection system in accordance with the present invention.

A leak detection system in accordance with the present invention is shown in schematic form in FIG. 1. The system can perform both fine leak tests, or tests at relatively low test port pressure, and gross leak tests, or tests on large volume or leaky test pieces. The fine leak test is performed in accordance with a known contraflow technique as described in U.S. Pat. No. 3,690,151. The gross leak test is performed in a novel manner as shown and described hereinafter.

A test piece 10 or a sniffer probe (not shown) is coupled vacuum-tight to a test port 12. The test port 12 is coupled through a roughing valve 14 to the inlet 16 of a mechanical vacuum pump 18. The elements shown in FIG. 1 are coupled by suitable gas-tight connections, such as 1½-inch O.D. tubing. The inlet 16 to the mechanical vacuum pump 18 is also coupled through a test valve 20 to the foreline 22 of a high vacuum pump 24. The high vacuum pump 24 can be a diffusion pump or a turbomolecular pump. An inlet of the pump 24 is coupled to an inlet of a spectrometer tube 26. The pump 24 and the spectrometer tube 26 can be similar to the units used in the Model 938-41 Leak Detector manufactured by the Varian Vacuum Products Division. A vent valve 28 coupled to the test port 12 permits venting of the test piece 10, while a vacuum gauge 30 coupled to the test port 12 measures the pressure thereof.

In the present example, the mechanical vacuum pump 18 is a two-stage rotary vane pump such as a Varian Model SD200 or SD300. The pump includes a first stage 36 connected to the inlet 16 and a second stage 38 which is connected to the output of the first stage 36 by an interstage conduit 40. The second stage 38 is exhausted through a pump output 42. The pump also includes a gas ballast connection point 44 normally used for degassing the pump oil for removal of water vapor. An interstage connection point 46 is provided by boring a hole through the wall of the vacuum pump 18 to the interstage conduit 40. The test port 12 is connected through a gross leak test valve 50 to the interstage connection point 46. Although the connections to the vacuum pump 18 are shown schematically in FIG. 1, it will be understood that such connections are made by gas-tight fittings. Gas drawn through the inlet 16 passes in succession through the first stage 36 and the second stage 38 to the output 42. Gas drawn through the interstage connection point 46 passes through the second stage 38 to the output 42. A small fraction of lighter gases received at the point 46 passes in reverse direction through the first stage 36 to the inlet 16.

The leak detection system shown in FIG. 1 has several modes of operation controlled by the states of the vacuum valves 14, 20, 28 and 50. It will be understood that the states of the valves and the corresponding modes of operation can be controlled manually, or can be controlled automatically by an electronic control system. In a roughing mode, the test piece 10 is reduced in pressure from atmospheric pressure to an intermediate pressure, which depends in part on the characteristics of the vacuum pump used for roughing and in part on the size of the test piece and the severity of the leak. After the roughing cycle, the system is switched to a fine leak test mode or a gross leak test mode. Typically, the fine leak test mode is used for test port intermediate pressures below about 100 millitorr, while the gross leak test mode is used for test port intermediate pressures above about 100 millitorr. After completion of the leak test, the test piece 10 is vented to atmospheric pressure and removed.

In the roughing mode, the roughing valve 14 is opened while the valves 20, 28 and 50 are closed. The test port 12 is thus connected to the inlet of the mechanical vacuum pump 18 which reduces the test port pressure from atmospheric pressure to the intermediate pressure level. If the vacuum gauge 30 indicates a pressure compatible with the foreline 22 of the high vacuum pump 24 (about 100 millitorr or lower), the fine leak test mode is initiated by opening the test valve 20, with valves 28 and 50 remaining closed and valve 14 remaining open. The tracer gas helium is introduced onto the outer surface of the test piece 10 such as by helium spray. Alternatively, if the test piece is pressurized with helium, then the sniffer probe is moved around the outside of the test piece. The helium is drawn through leaks into the interior of the test piece 10, or is drawn into the sniffer probe, and passes into the leak detection system through the test port 12. The helium then passes through the valves 14 and 20 and into the high vacuum pump foreline 22. As is known in the art, the helium, because of its light weight, diffuses in a reverse direction through the high vacuum pump 24 to the spectrometer tube 26. The spectrometer tube 26 is tuned to detect and measure helium and to provide an output signal which is proportional to the quantity of helium in the gas sample received from the test piece 10 or sniffer probe. The helium concentration is proportional to the leak rate of the test piece 10. While the pump 24 passes only a specified fraction of the helium to the spectrometer tube 26, a sufficient quantity reaches the spectrometer tube 26 to permit a highly accurate reading of leak rate. After leak testing is complete, the rough valve 14 is closed and the vent valve 28 is opened to vent the test piece 10 to atmosphere and permit its removal. Test valve 20 remains open during vent.

In some cases, it is not possible during the roughing cycle to reach the pressure of approximately 100 millitorr required at the foreline 22 of the pump 24. This may become evident during the roughing cycle or may be known in advance when the test piece is particularly large or leaky. In this situation, the gross leak test mode is used. To place the system in the gross leak test mode, roughing valve 14 is closed; and test valve 20 and gross leak test valve 50 are opened with valve 28 remaining closed. The test sample including the helium tracer gas is introduced from the test port 12 through the valve 50 to the interstage connection point 16 of the mechanical vacuum pump 18. The inlet 16 to the pump 18 is isolated from the test port 12 and is connected through the valve 20 to the foreline 22 of the pump 24. The pressure at the test port 12 is higher than the pump foreline 22 pressure by an amount equal to the pressure drop through the first stage 36 of the mechanical vacuum pump 18. Typically, the pressure at the foreline 22 can be maintained at or below the required 100 millitorr for test port 12 pressures up to approximately 400 torr.

A large portion of the sample gas received from the test port 12 is exhausted through the second stage 38 of the vacuum pump 18. However, it has been found that a measurable quantity of helium passes in reverse direction through the first stage 36 to the inlet 16. The helium then passes in reverse direction through the pump 24 to the spectrometer tube 26 and is measured as described hereinabove in connection with the fine leak test mode. The amount of helium reaching the spectrometer tube is proportional to the size of the leak in the test piece 10. As is well known in the art, the measured helium can be calibrated to correspond to a given leak rate. After leak testing is complete, the rough valve 14 is closed and the vent valve 28 is opened to vent the test piece to atmosphere and permit its removal. Valve 50 is closed and valve 20 remains open during vent.

Figure 2:
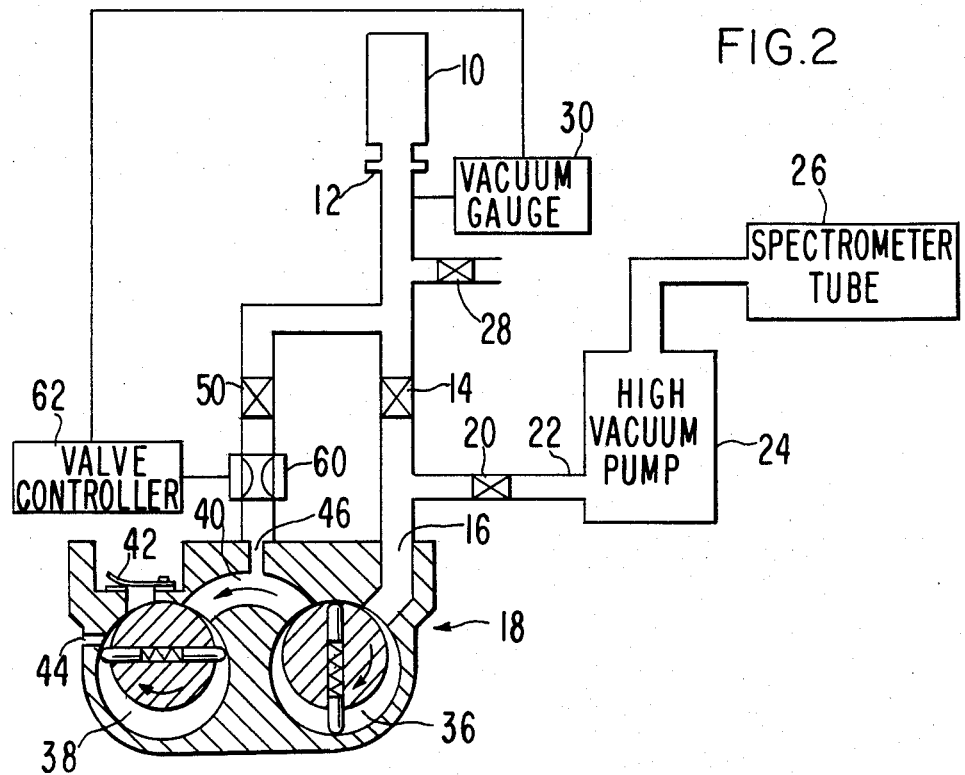
FIG. 2 is a schematic diagram of another preferred embodiment of the present invention.

Another feature of the present invention is shown in FIG. 2. The leak detection system of FIG. 2 is similar in most respects to the system shown in FIG. 1, with corresponding elements designated by the same reference numerals. In addition, the system of FIG. 2 includes a modulator valve 60, connected in series with the gross leak test valve 50, in the conduit between the test port 12 and the interstage connection point 46. The system of FIG. 2 operates in the manner described hereinabove for the roughing mode and the fine leak test mode. The modulator valve 60 shown in FIG. 2 permits gross leak tests to be performed at higher test port 12 pressures. The modulator valve 60 is controlled by a valve controller 62 in response to a signal from the vacuum gauge 30 representative of the test port 12 pressure. The modulator valve 60 varies the gas flow rate between the test port 12 and the mechanical vacuum pump 18 in response to the control signal from the controller 62. For example, the controller 62 can control the valve 60 so as to reduce the flow rate as the test port 12 pressure increases above 400 torr. The controller 62 can provide a predetermined flow rate versus test port 12 pressure characteristic. Thus, the pressure at the foreline 22 of the pump 24 is maintained at an acceptable level during a gross leak test, even for pressures at test port 12 in excess of 400 torr.

Figure 2A:
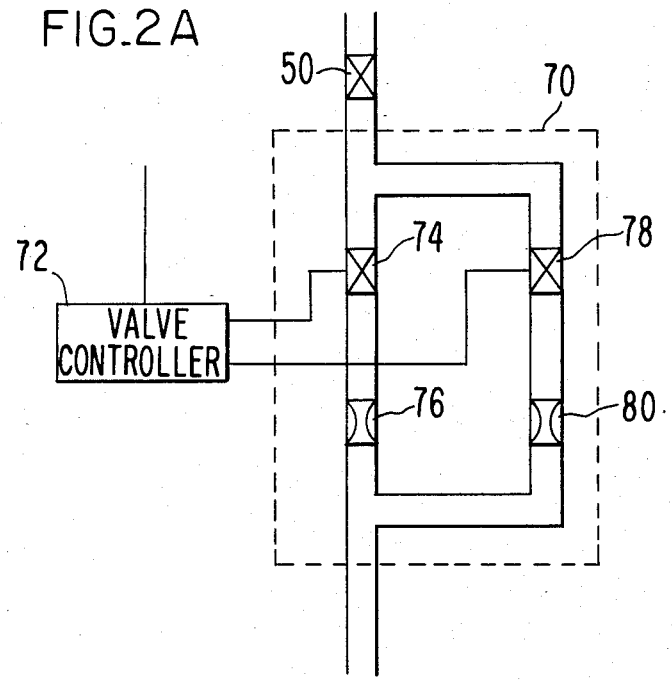
FIG. 2A illustrates an alternate to the modulator valve shown in FIG. 2.

An alternative to the modulator valve 60 shown in FIG. 2 is illustrated in schematic form in FIG. 2A. The modulator valve 60 is replaced by fixed flow restrictors and valves in a parallel connection. FIG. 2A illustrates only the portion of the leak detection system of FIG. 2 between the test port 12 and the interstage connection point 46. The remainder of the system is as shown in FIG. 2. A flow restriction means 70 is connected in series with the gross leak test valve 50. A valve controller 72 receives a signal representative of the test port 12 pressure from the vacuum gauge 30 and controls the flow control means 70. The flow control means 70 includes a valve 74 connected in series with a flow restrictor 76 and a valve 78 connected in series with a flow restrictor 80. The valve 74 and restrictor 76 combination is connected in parallel with the valve 78 and restrictor 80 combination to form the flow control means 70. The valve 74 controls gas flow through the restrictor 76 while the valve 78 controls flow through the restrictor 80. The valves 74, 78 are controlled by the valve controller 72 in response to the pressure measured at the test port 12.

In operation, the valve controller 72 permits flow through the different flow restrictors depending on the pressure at the test port 12. For example, valve 74 can be opened and valve 78 closed at pressures between 400 torr and 600 torr, while valve 78 is open and valve 74 is closed for pressures above 600 torr. At pressures below 400 torr, both valves 74, 78 may be opened to obtain increased flow. It will be understood that additional parallel-connected valves and flow restrictors can be added to increase the degree of control over flow into the mechanical vacuum pump 18.

Figure 3:
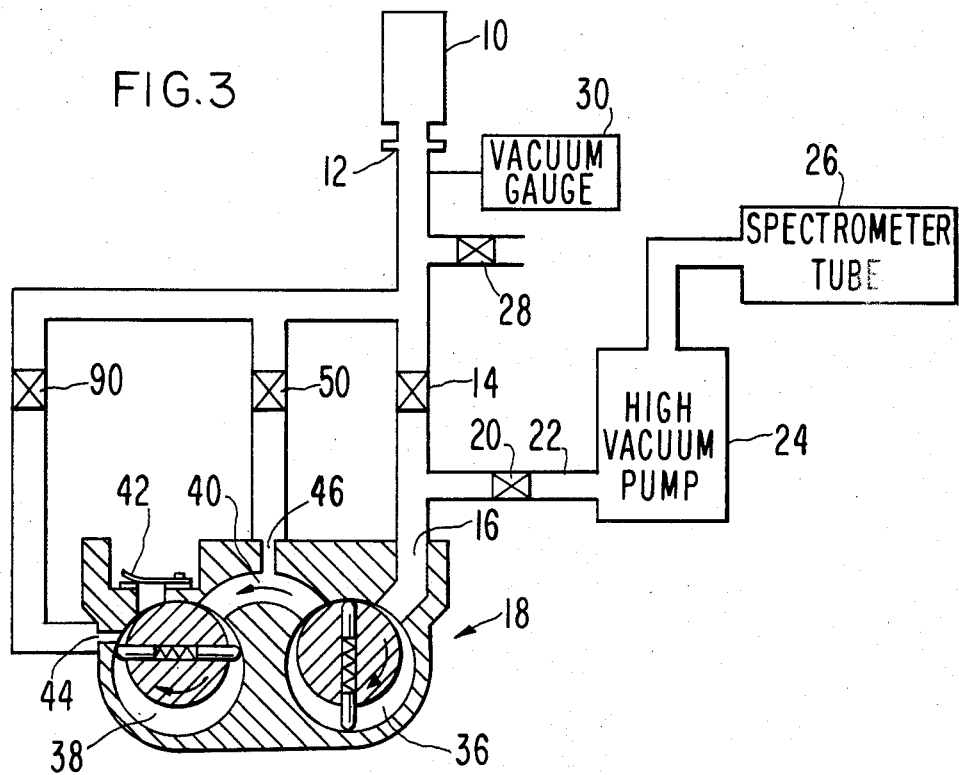
FIG. 3 is a schematic diagram of yet another preferred embodiment of the present invention.

Another feature of the present invention is illustrated in FIG. 3. The leak detection system of FIG. 3 is similar in most respects to the system shown in FIG. 1 with corresponding elements designated by the same reference numerals. The system of FIG. 3 operates in the manner described above for the roughing mode and the fine leak test mode. The gross leak test mode is performed as described hereinabove in connection with FIG. 1 by opening valves 50 and 20 and by closing valve 14. The leak detection system of FIG. 3 includes an additional gastight connection between the test port 12 and the gas ballast connection point 44 at the output of the second stage 38 of the mechanical vacuum pump 18 through a high pressure leak test valve 90. As noted hereinabove, the valve 50 connected to the interstage connection point 46 permits gross leak tests in the range from 100 millitorr up to about 400 torr test port 12 pressure. In some circumstances, it is necessary to perform leak tests at pressures in the range between 400 torr and atmospheric pressure. In this case, the system shown in FIG. 3 is utilized.

In order to perform a high pressure leak test in accordance with the present invention, the test piece is first rough vacuum pumped in a roughing cycle as described hereinabove with valve 14 open and valves 28, 50, 90 and 20 closed. Then, with valves 28 and 50 remaining closed, the valve 14 is closed; and the high pressure leak test valve 90 and the test valve 20 are opened. This provides a connection between the test port 12 and the output of the second stage 38 of the vacuum pump 18. The test port 12 therefore can operate at a pressure considerably higher than that required at the foreline 22 of the pump 24. The difference in pressures is determined by the pressure drop through the vacuum pump 18. It has been found that with this arrangement the foreline 22 can be maintained at or below the required pressure of 100 millitorr, while the test port 12 can be operated in the range between 400 torr and atmospheric pressure. Helium received in the test sample from the test piece 10 passes in reverse direction through the second stage 38 and the first stage 36 of the mechanical vacuum pump 18 and then passes in reverse direction through the pump 24 to the spectrometer tube 26 and is measured. It will be understood that only a fraction of the helium passes through both of the vacuum pumps 18 and 24 in reverse direction. However, since a substantial leak is necessary to raise the pressure above the 400 torr level, a large amount of helium is received and a sufficient quantity of helium reaches the spectrometer tube 26 to be measured.

The present invention has teen described with reference to two stage rotary vane mechanical vacuum pumps. In general, the invention can be utilized in a gross leak test or high pressure leak test by passing the test sample in reverse direction through one or more stages of any roughing, or mechanical vacuum pump of suitable construction. Furthermore, the invention has been described with reference to a contraflow type leak detection system. In general, the invention can be utilized with any suitable leak detection system requiring a relatively low pressure at its input, so as to increase the permissible test port pressure. The high vacuum pump 24 and the spectrometer tube 26 combination shown in FIGS. 1-3 can be considered a leak detection instrument requiring an operating pressure of about 100 millitorr at the pump foreline. The remaining elements function, in part, to control the pressure at the foreline, as described hereinabove.

The system of the present invention has been described hereinabove in respect to permitting leak tests at relatively high test port pressures. An additional important advantage of the present system is that the leak detection system requires only a single mechanical vacuum pump for operation over a wide range of pressures. Prior art systems have typically required a roughing pump used during a roughing cycle and during a leak test, and a forepump utilized with a diffusion pump to maintain the required pressure at the diffusion pump foreline during a leak test. By elimination of the requirement for a second mechanical vacuum pump in the present invention, the size, cost and weight of the leak detection system are substantially reduced.

While there has been shown and described what is at present considered the preferred embodiments of the invention, it will be obvious to those skilled in the art that various changes and modifications may be made therein without departing from the scope of the invention as defined by the appended claims.

I claim:

1. Apparatus for leak detection at relatively high test port pressure, comprising:
   a test port adapted for receiving a test sample containing a trace gas;
   a leak detection instrument requiring a relatively low pressure for proper operation;
   a mechanical low vacuum pump of the type suitable for roughing and foreline pumping use having an inlet and an interstage connection point between first and second stages; and
   interconnection means for making fluid connection between said test port and said interstage connection point and between said inlet of said vacuum pump and said leak detection instrument during a gross leak test cycle, whereby said trace gas passes, at least in part, in reverse direction through said mechanical vacuum pump to said leak detection instrument.

2. Apparatus as defined in claim 1 wherein said leak detection instrument comprises
   a gas analysis instrument tuned to detect said trace gas and having an inlet for receiving said trace gas, and
   high vacuum pumping means characterized by a relatively high reverse diffusion rate for light gases and a relatively low reverse diffusion rate for heavy gases, said high vacuum pumping means having a pump inlet coupled to said inlet of said gas analysis instrument and a foreline which is the inlet of said leak detection instrument such that said trace gas passes in reverse direction through said high vacuum pumping means to said gas analysis instrument.

3. Apparatus as defined in claim 2 wherein said high vacuum pumping means comprises a diffusion pump.

4. Apparatus as defined in claim 2 wherein said high vacuum pumping means comprises a turbomolecular pump.

5. Apparatus as defined in claim 2 wherein said gas analysis instrument comprises a spectrometer tube tuned to detect helium.

6. Apparatus as defined in claim 1 wherein said mechanical vacuum pump comprises a two stage rotary vane mechanical vacuum pump.

7. Apparatus as defined in claim 6 wherein said interconnection means further includes means for making fluid connection between said test port and said inlet of said mechanical vacuum pump during a roughing cycle prior to said gross leak test cycle.

8. Apparatus as defined in claim 6 wherein said interconnection means further includes means for making fluid connection between said test port and a gas ballast port on the output side of the second stage of said mechanical vacuum pump and for making fluid connection between said inlet of said mechanical vacuum pump and said leak detection instrument during a high pressure gross leak test cycle, whereby said trace gas passes, at least in part, in reverse direction through both stages of said mechanical vacuum pump to said leak detection instrument.

9. Apparatus as defined in claim 1 further including means for sensing the pressure level at said test port and providing a test port pressure signal, and
   restriction means disposed in the fluid connection between said test port and said interstage connection point for restricting the flow of gas in response to said test port pressure signal in accordance with a predetermined relationship between test port pressure and flow rate.

10. Apparatus as defined in claim 9 wherein said restriction means comprises a modulator valve.

11. Apparatus as defined in claim 9 wherein said restrictor means comprises a plurality of parallel connected vacuum valves and associated flow restrictors.

12. Apparatus as defined in claim 7 wherein said interconnection means further includes means for making direct fluid connection between said test port and said leak detection instrument during a fine leak test cycle when the test port pressure is compatible with said leak detection instrument.

13. A method for leak detection at relatively high test port pressure with a leak detection instrument requiring a relatively low pressure for proper operation, comprising the steps of:
- initially evacuating the test port by connecting the inlet of a mechanical vacuum pump thereto while isolating the leak detection instrument from the test port; and
- subsequently connecting the test port to an outlet of a stage of said mechanical vacuum pump and connecting the inlet of the mechanical vacuum pump to the inlet of the leak detection instrument such that said inlet of the leak detection instrument is maintained at low pressure and the trace gas received at said test port passes, at least in part, in reverse direction through the mechanical vacuum pump to the leak detection instrument.

14. The leak detection method as defined in claim 13 wherein the step of connecting the test port to said mechanical vacuum pump includes connecting the test port to a connection point between the stages of a two-stage rotary vane mechanical vacuum pump.

15. The leak detection method as defined in claim 14 further including the steps of
- sensing the pressure level at said test port, and
- restricting the flow of gas from said test port to said connection point in response to the pressure level at said test port such that the pressure at the inlet of said leak detection instrument is maintained at an acceptable level.

16. The leak detection method as defined in claim 13 wherein the step of connecting the test port to said mechanical vacuum pump includes connecting the test port to a gas ballast port at the second stage output of a two-stage rotary vane mechanical vacuum pump.

17. Apparatus for leak detection at relatively high test port pressure, comprising:
- a test port adapted for receiving a test sample containing a trace gas;
- a leak detection instrument requiring a relatively low pressure for proper operation;
- a two stage mechanical vacuum pump having an inlet and a gas ballast connection point at the output of the second stage; and
- interconnection means for making fluid connection between said test port and said gas ballast connection point and for making fluid connection between said inlet of said vacuum pump and said leak detection instrument during a gross leak test cycle, whereby said trace gas passes, at least in part, in reverse direction through both stages of said mechanical vacuum pump to said leak detection instrument.

18. Apparatus as defined in claim 17 wherein said leak detection instrument comprises
- a gas analysis instrument tuned to detect said trace gas and having an inlet for receiving said trace gas, and
- high vacuum pumping means characterized by a relatively high reverse diffusion rate for light gases and a relatively low reverse diffusion rate for heavy gases, said high vacuum pumping means having a pump inlet coupled to said inlet of said gas analysis instrument and a foreline which is the inlet of said leak detection instrument such that said trace gas passes in reverse direction through said high vacuum pumping means to said gas analysis instrument.

19. Apparatus as defined in claim 18 wherein said interconnection means further includes means for making fluid connection between said test port and said inlet of said mechanical vacuum pump during a roughing cycle prior to said gross leak test cycle.

20. Apparatus for leak detection comprising:
- a test port adapted for receiving a test sample containing a trace gas;
- a gas analysis instrument tuned to detect said trace gas and having an inlet for receiving said trace gas;
- high vacuum pumping means characterized by a relatively high reverse diffusion rate for light gases and a relatively low reverse diffusion rate for heavy gases, said high vacuum pumping means having a pump inlet and a foreline, said pump inlet being coupled to said inlet of said gas analysis instrument;
- a mechanical vacuum pump having at least a first stage;
- interconnection means for making fluid connection between said test port and an inlet of said mechanical vacuum pump during a roughing cycle; and
- interconnection means for making fluid connection between said test port and a connection point at the outlet of said first stage of said mechanical vacuum pump and between said inlet of said vacuum pump and said foreline of said high vacuum pumping means during a gross leak test cycle,
- whereby said trace gas passes, at least in part, in reverse direction through said mechanical vacuum pump and said high vacuum pumping means to said gas analysis instrument during said gross leak test cycle.

21. Apparatus for leak detection at relatively high test port pressure, comprising:
- a test port adapted for receiving a test sample containing a trace gas;
- a leak detection instrument requiring a relatively low pressure level for proper operation; and
- a mechanical low vacuum pump of the type suitable for roughing and foreline pumping use having at least one stage connected in reverse direction between said test port and said leak detection instrument such that the trace gas passes in reverse direction from the outlet through said at least one stage to the inlet thereof and then to said leak detection instrument.

* * * * *